Figure 1:
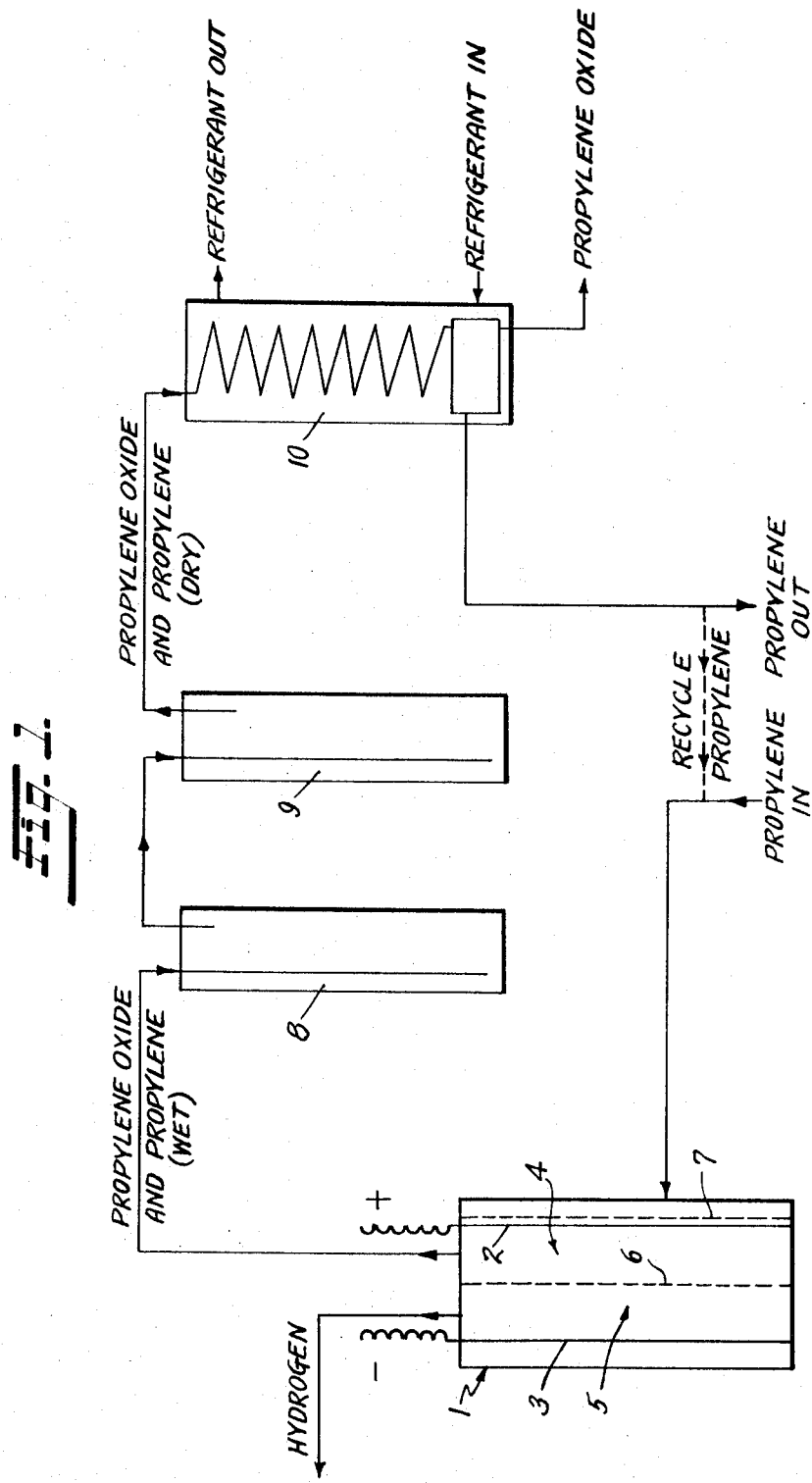

United States Patent

Binns et al.

[15] 3,635,803
[45] Jan. 18, 1972

[54] PREPARATION OF OLEFIN OXIDE FROM AN OLEFIN

[72] Inventors: Thomas David Binns, Watford; David Cyril George Gattiker, London, both of England

[73] Assignee: Interoxo A.G., Glarus, Switzerland

[22] Filed: Sept. 30, 1970

[21] Appl. No.: 76,781

Related U.S. Application Data

[63] Continuation-in-part of Ser. No. 879,159, Nov. 24, 1969, abandoned.

[52] U.S. Cl. ........................................204/80, 260/348.5 L
[51] Int. Cl. .................C07b 29/06, C07d 1/08, C07d 1/14
[58] Field of Search ..............................................204/78–80; 260/348.5 L

[56] References Cited

UNITED STATES PATENTS

| | | | |
|---|---|---|---|
| 3,288,692 | 11/1966 | Leduc | 204/80 |
| 3,394,059 | 7/1968 | Young | 204/78 |
| 3,497,431 | 2/1970 | Kronig et al. | 204/80 |

FOREIGN PATENTS OR APPLICATIONS

| | | | |
|---|---|---|---|
| 1,243,170 | 6/1967 | Germany | 204/78 |
| 1,258,856 | 1/1968 | Germany | 204/80 |

Primary Examiner—F. C. Edmundson
Attorney—Clelle W. Upchurch

[57] ABSTRACT

An olefin oxide is produced by electrolysis of an aqueous medium containing acetate ions while an olefin is added to the medium.

32 Claims, 2 Drawing Figures

PREPARATION OF OLEFIN OXIDE FROM AN OLEFIN

This application is a continuation-in-part of our copending application Ser. No. 879,159 filed Nov. 24, 1969, now abandoned.

This invention relates generally to a process for making olefin oxides and more particularly to an improved process for making propylene ocide.

At present, practically all commercial propylene oxide is produced by the so-called chlorohydrin process. This involves the reaction between propylene and hypochlorous acid, the starting materials being propylene, chlorine and water. The propylene chlorohydrin produced is separated from the reaction mixture and then saponified with milk of lime producing propylene oxide which requires rather extensive purification to separate it from the other relatively minor chlorinated products coproduced. The chlorine is converted to calcium chloride which has only a limited market and therefore represents not only a disposal problem in the form of large disposal ponds but also a waste of the chlorine which has served only as an intermediate. The extent of this problem lies in the fact that 1½ tons of chlorine and 1½tons of lime are used for each oxide produced.

It has been proposed heretofore to produce propylene oxide by electrolyzing an aqueous medium containing an electrolyte while introducing propylene into the electrolyte near the anode of an electrolytic cell. For example, LeDuc U.S. Pat. No. 3,288,692 discloses a process in which a metal halide electrolyte is used. In accordance with that process, an intermediate halohydrin such as a chlorohydrin of the olefin is produced near the anode while hydrogen and hydroxyl ions are being produced adjacent to the cathode. Olefin oxide is produced by dehydrohalogenation. Such a process has the disadvantage of producing propylene oxide in low yield while simultaneously producing an number of halogenated byproducts. These byproducts contribute to impurities in the olefin oxide, contribute to low current efficiencies and to low yields based on olefin feed stock and electrolytic media.

Another process for producing olefin oxides by electrolysis is disclosed by LeDuc in U.S. Pat. No. 3,427,235. According to this process, an olefin oxide is produced by direct oxidation in an electrolytic cell when an aqueous reaction medium containing certain specific electrolytes is electrolyzed. Among the various electrolytes suggested are water-soluble alkali metal salts of citric acid, oxalic acid, gluconic acid, benzoic acid, phthalic acid and formic acid. It has been found, however, that the yield of propylene oxide based on the amount of propylene introduced into the electrolyte and also the yield of propylene oxide based on current are undesirably low and commercially impractical. A further disadvantage of the process is that an expensive catalyst, usually silver, is required.

It has also been proposed to prepare propylene oxide by the direct oxidation of propylene by means of an organic peroxygen compound. One such process produces 2.5 tons styrene per ton of propylene oxide while another one produces 2.2 tons tertiary butanol per ton of propylene oxide. A further disadvantage of such processes is that they are commercially practical only with large production of capacities of 25,000 tons or more propylene oxide per year.

It is therefore an object of this invention to provide an electrolytic process for producing propylene oxide which is devoid of the foregoing disadvantages. Another object of the invention is to provide an electrolytic process for producing propylene oxide from propylene in improved yield based on the amount of propylene used. Still another object of the invention is to provide a process for electrolytically producing propylene oxide from propylene while avoiding the simultaneous production of undesirable quantities of substantially valueless byproducts. A further object of the invention is to provide a process for producing propylene oxide by a process which involves electrolysis of an electrolyte without an expensive catalyst. A still further object of the invention is to provide a process for producing propylene oxide from propylene by electrolysis of an aqueous medium which avoids corrosion problems inherent with the process using a metal halide as the electrolyte. A more specific objective of the invention is to provide a process for producing from a propylene feed stock, propylene oxide of high purity requiring a minimum amount of purification, and without forming substantial quantities of byproducts. Such byproducts constitute a marketing problem or chemical disposal problem. They also contribute to increased olefin oxide purification problems, low current efficiency and low yields resulting in increased consumption of olefin feed stock and consumption of electrolyte.

Figure 2:
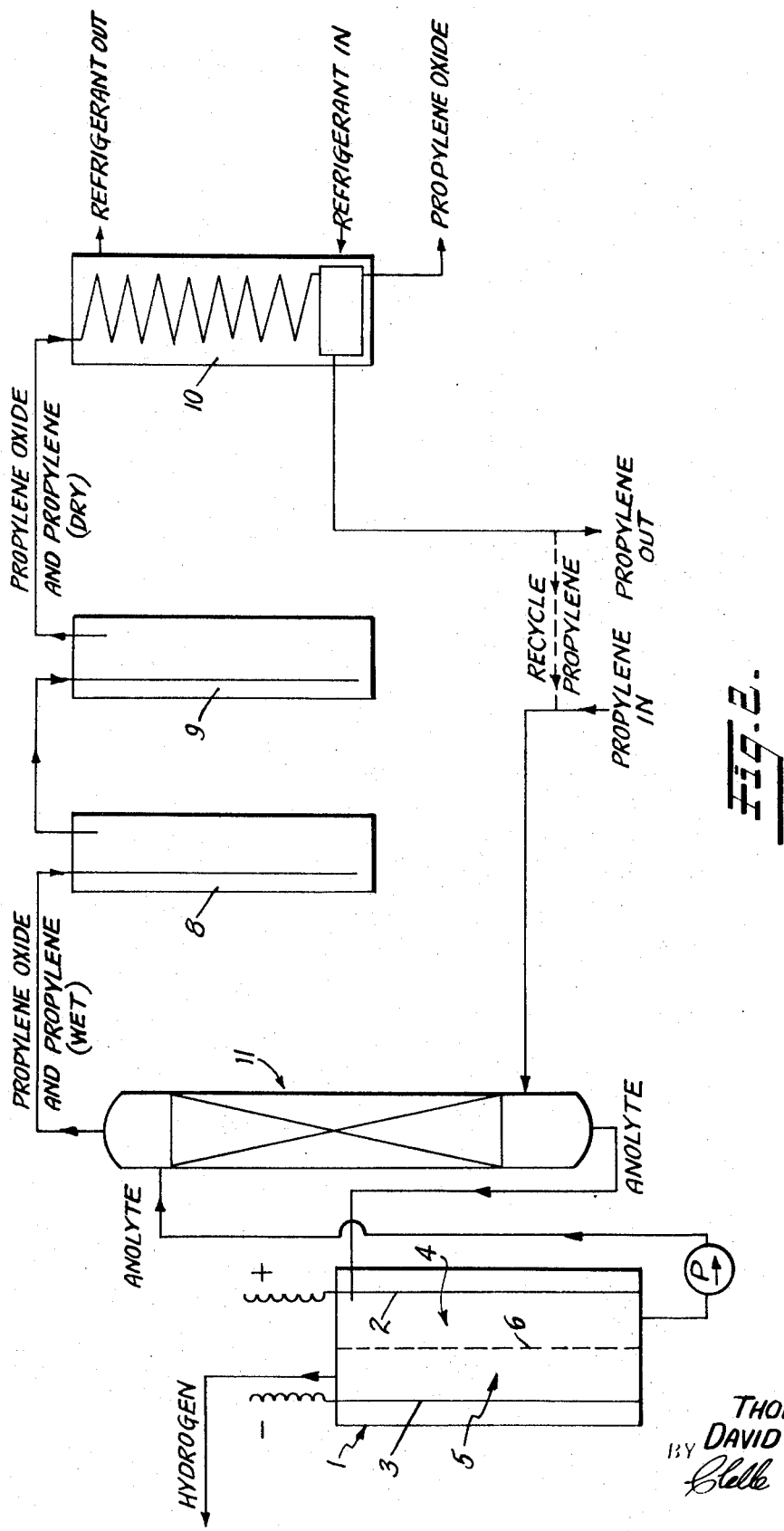

Other objects will become apparent from the following description with reference to the accompanying drawings in which:

FIG. 1 illustrates diagrammatically one embodiment of the invention wherein propylene is mixed with the anolyte in an electrochemical cell; and FIG. 2 illustrates diagrammatically another embodiment of the invention wherein the anolyte and propylene are mixed together in a separate reactor instead of in the electrochemical cell.

The objects of this invention are accomplished, generally speaking, by providing a process making propylene oxide wherein a propylene feed stock is mixed with an anolyte prepared in an electrochemical cell by subjecting an aqueous solution containing acetate ions to electrolysis and recovering the propylene oxide thus produced. Best results have been obtained so far with copper acetate, cobalt acetate, thallium acetate, nickel acetate, silver acetate or lithium acetate with or without acetic acid so these acetates and mixtures thereof are preferred. It appears that an acetate of any metal which has more than one oxidation state, the lower of which is more stable than the higher, and which is capable of forming a complex with the complexing agents disclosed herein give the best results. Preferably, the aqueous solution contains silver acetate, acetic acid and a complexing agent such as, for example, a heterocyclic ring compound containing at least one nitrogen atom in the ring. A pyridine compound is the preferred complexing agent. Any suitable concentration of the acetate may be used but it is preferred that from about 0.5 percent by weight of the aqueous medium to just below the saturation point of the acetate in the aqueous medium at the operation temperature of the cell be used. One of the preferred aqueous solutions contains about 5 percent of one of the above metallic acetates, such as, for example, silver acetate, from about 1 to 4 moles acetic acid and from about 3 to 5 moles complexing agent, such as, for example, pyridine, per mole of metallic acetate. It has been found that the yield of propylene oxide produced and the current efficiency of the cell operation is improved by the further addition to the anolyte of the complexing agent. Any suitable complexing agent may be used such as a heterocyclic ring compound having a nitrogen atom in the ring for example, 1,3,4-triazole, 1-hydroxpyridene, pyridene, imidazole, pyrazole and the like.

It has been found that propylene may be introduced near the anode into the electrochemical cell where the above-described aqueous solution is being subjected to electrolysis or propylene may be mixed with the anolyte after electrolysis in a separate reactor such as, for example, an absorption column. Any suitable conventional reactor may be used which will effect intimate mixing of the propylene with the anolyte. Examples of suitable reactors include packed columns, plate columns, columns provided with sieve trays or the like.

In a preferred embodiment of the invention, a portion of the anolyte is continuously removed from the electrochemical cell and is circulated through an outside reactor where it is mixed with a fluid containing propylene gas, and then back to the anode compartment of the cell. The anolyte becomes saturated with propylene oxide and gaseous propylene oxide and propylene evolve from the liquid phase in the reactor and are recovered. The recovered propylene oxide is separated from the propylene by any suitable means and the propylene may be recirculated to the outside reactor. The propylene is preferably added as a gas to the reactor through a glass frit or similar device which will disperse the gas uniformly as small bubbles throughout the liquid phase.

It has been found that an improved yield of propylene oxide is obtained when one of the acetates enumerated above is used instead of the metal halides and alkali metal organic salts of the prior art. The effluent gas from the anode compartment or from the separate reactor, if a separate reactor is used, consists essentially of unreacted propylene and propylene oxide. The propylene oxide can be separated from propylene by any suitable method but one of the more convenient methods is to pass the effluent gas through a trap to remove entrained electrolyte, through a drier and then a cold trap which condenses the propylene oxide. The temperature of the trap can be any temperature between those where propylene oxide and propylene condense.

Any suitable electrochemical cell of conventional design can be used. It is preferred but not essential that the cell be divided into an anode compartment and cathode compartment separated by means of an anion exchange membrane or diaphragm to restrict the passage of metallic ions into the catholyte. Any of the known suitable membranes may be used. These usually consist of textile fabric impregnated with a suitable ion exchange resin. Commercially available membranes sold as Ionac MA 3475 or Neosepta CL 2.5 percent sold by Tokuyama Soda Company of Japan and Selennion AMV sold by Asaki Glass Company of Japan have been used to advantage.

Any suitable anode may be used but it is preferred to use a porous anode in those embodiments of invention wherein propylene is introduced into the electrochemical cell to facilitate distribution of propylene over its surface and into intimate contact therewith. The anode is preferably a platinum, ruthenium, oxidized ruthenium, platinized titanium, ruthenium coated titanium or oxidized ruthenium coated titanium, lead oxide coated titanium or other suitable metal. Since the cathode plays only a minor part in the process, it can be made of any suitable known cathodic material such as stainless steel, nickel or the like.

In practicing the invention, generally speaking, an electrochemical cell is provided with an anode and cathode separated by a suitable diaphragm. The anode compartment of the cell is charged with an aqueous medium containing one of the acetate electrolytes provided by the invention. The anode is electrically connected to the positive side of a direct current source and the cathode to the negative side. The cathode compartment is charged with an aqueous solution of acetate of an alkali metal preferably sodium acetate, potassium acetate or lithium acetate. Electrolysis is begun and propylene is introduced continuously into the resulting anolyte. The temperature of the electrolyte may be about room temperature of about 60° F. or lower. Propylene oxide and propylene gas escape from the liquid medium and are collected and separated. The propylene may be recirculated to the anode compartment or reactor after the separation, if so desired.

It is possible to operate at current densities as high as 100 to 500 amperes per square foot of anode surface. The anode potential with reference to the anolyte must be below that at which gaseous oxygen is generated at the anode surface in order to obtain optimum product yield based on the current input.

It is found usually most convenient to operate the cell and the absorption column at atmospheric pressures. However, without departing from the embodiments of the invention herein described it is possible to operate at pressures below atmospheric corresponding to a few millimeters of mercury or at pressures above atmospheric up to and including the pressure corresponding to the temperature of operation at which propylene is a liquid. Moreover it is sometimes desirable to operate the electrochemical cell, when using the separate reactor, at pressures different from that of the reactor and at temperatures different from that of the reactor.

The use of an external reactor makes it possible to optimize the mixing of the propylene gas with the liquid electrolyte resulting in a more readily controlled reaction between gas and liquid than if mixed directly in the cell. Furthermore since cells are most easily operated at atmospheric pressures and temperatures mixing the gas and liquid in an external reactor enables the reaction between the gas and the liquid to be performed at temperatures and pressures different from those at which the cell is operated, these being temperatures and pressures which are most favorable to obtaining maximum yields of propylene oxide having regard to the amounts of propylene feed stock consumed and electric power consumed.

The anolyte after electrolysis has begun becomes saturated with propylene oxide. This aids contact between propylene gas and acetate ions in the anolyte. This dissolved propylene oxide may be recovered, if desired, but it is not recovered ordinarily because of the expense involved.

The gaseous effluent from the cathode is substantially pure hydrogen which has many uses or can be sold.

Propylene oxide is becoming more and more important as a raw material for making propylene glycol and polyoxypropylene glycols of various molecular weights. The polyoxypropylene glycols are used in large quantities in making polyurethane plastic foams for upholstery, insulation and numerous other purposes.

One advantage of the process provided by this invention is that no catalyst is required.

Although the invention is described herein primarily with reference to the synthesis of propylene oxide from propylene because it is of most importance commercially, any other olefin oxide such as, for example, ethylene oxide or butylene oxide can be similarly produced from the corresponding olefin and the synthesis of all olefin oxides is contemplated within the broader aspects of the invention.

In the following examples, all parts are by weight unless otherwise specified.

EXAMPLE 1

As illustrated in FIG. 1 of the drawing, an electrochemical cell 1 has a platinized titanium mesh anode 2 about 24 inches by about 6 inches and a cathode 3 of stainless steel spaced about one-half inch from the anode 2. An anode compartment 4 is separated from cathode compartment 5 by an anion exchange membrane diaphragm 6. The anolyte in compartment 4 is a 5 percent aqueous solution of copper acetate. The catholyte in compartment 5 is a 5 percent aqueous solution of sodium acetate. The anolyte and catholyte are continuously circulated by pumping to ensure homogeneity and uniform temperature throughout compartments 4 and 5.

Porous plastic plate 7 is adjacent to anode 2 to insure optimum distribution of propylene gas over the surface of anode 2. A direct current of 114 amperes is applied to anode 2 and cathode 3. The anode potential is about 2.1 volts in relation to the electrolyte as measured against a silver-silver chloride reference electrode.

Propylene is added to cell 1 adjacent to anode 2. When analysis of the anolyte indicates it is saturated with propylene oxide, propylene flow is adjusted to a rate of about 173 liters per hour. The gaseous effluent from compartment 4 is passed through trap 8 where entrained anolyte is separated therefrom and returned to compartment 4. The effluent leaving trap 8 flows through molecular sieve drier 9 and then through trap 10 maintained at about −10° C. to condense propylene oxide. The hydrogen effluent from compartment 5 may be conducted to any suitable storage vessel vented to the atmosphere.

The condensate from trap 10 after 10 hours electrolysis weighs about 910 grams and analyzes about 99.4 percent propylene oxide, about 0.2 percent acrolein and about 0.4 percent propanediol. About 20 percent of the propylene is converted to propylene oxide and the current efficiency based on conversion of propylene to propylene oxide is about 73 percent. The anolyte is saturated with propylene oxide. The temperature of anolyte and catholyte is about 70° F. throughout the electrolysis with the temperature outside cell 1 being about 66° F.

EXAMPLE 2

Example 1 is repeated with the exception that anode 2 is oxidized ruthenium coated titanium, the anode potential is about 1.9 volts, the current about 76 amperes and propylene stock is introduced to compartment 4 at a rate of about 150 liters per hour. The condensate recovered from trap 10 weighs about 583 grams and analyzes about 99.2 percent propylene oxide, about 0.35 percent acrolein and about 0.45 percent propanediol. Conversion of propylene to propylene oxide is about 15 percent and the current efficiency is about 70 percent.

EXAMPLE 3

Example 1 is repeated with the exception that a 15 percent aqueous solution of cobalt acetate is used as the anolyte, the anode potential is about 1.95 volts, the current is about 80 amperes and 0.25 percent by weight of 1,2,4-triazole is added to the anolyte. Propylene gas is added to the cell at the rate of about 223 liters per hour. After about 10 hours electrolysis about 695 grams condensate is recovered from trap 10. The condensate analyzes about 99.1 percent propylene oxide, about 0.5 percent acrolein and about 0.4 percent propanediol. About 12 percent of the propylene is converted to propylene oxide. The current efficiency is about 80 percent.

EXAMPLE 4

Example 2 is repeated with the exception that a 15 percent aqueous solution of thallium acetate is used as the anolyte, the anode potential is about 1.9 volts, the current is about 79 amperes and 0.3 percent by weight of imidazole is added to the anolyte. Propylene is added to the cell at a rate of about 210 liters per hour for about 10 hours. About 710 grams condensate are recovered from trap 10. The condensate analyzes about 99.1 percent propylene oxide, about 0.4 percent acrolein and about 0.5 percent propanediol. About 13 percent of the propylene is converted to propylene oxide. The current efficiency is about 82 percent.

EXAMPLE 5

Example 1 is repeated with the exception that a 5 percent aqueous solution of silver acetate is used as the anolyte, to which has been added 4 molecular equivalents of acetic acid and 4 molecular equivalents of pyridene. The anode potential is about 1.3 volts, the current is about 90 amperes. Propylene gas is added to the cell at the rate of about 225 liters per hour. After about 10 hours electrolysis about 695 grams condensate is recovered from trap 10. The condensate analyzes about 99.1 percent propylene oxide, about 0.5 percent acrolein and about 0.4 percent propanediol. About 12 percent of the propylene is converted to propylene oxide. The current efficiency is about 71 percent.

EXAMPLE 6

Example 5 is repeated with the exception that, as shown in FIG. 2, the propylene gas, instead of being introduced into the anode compartment 4 of cell 1 is contacted with anolyte which is being circulated through an absorption column 11 outside the cell. Unreacted propylene and propylene oxide leave the top of the column and after passage through vessels 8 and 9, enter the cold trap 10. About 800 grams condensate are recovered from trap 10. The condensate analyzes about 99.1 percent propylene oxide, about 0.4 percent acrolein and about 0.5 percent propanediol. About 14 percent of the propylene is converted to propylene oxide. The current efficiency is about 82 percent.

Although the invention has been described in detail for the purpose of illustration, it is to be understood that such detail is solely for that purpose and variations can be made therein by those skilled in the art without departing from the spirit and scope of the invention.

The embodiments of the invention in which an exclusive property or privilege is claimed are defined as follows:

1. A process for producing ethylene oxide, propylene oxide, or butylene oxide which comprises passing an electric current through an aqueous medium containing lithium acetate, cobalt acetate, copper acetate, thallium acetate, nickel acetate or silver acetate in an electrochemical cell having an anode and cathode, mixing propylene, butylene or ethylene with the aqueous medium and separating the resulting olefin oxide from the effluent gas.

2. The process of claim 1 wherein the olefin is propylene and the olefin oxide is propylene oxide.

3. The process of claim 2 wherein said aqueous medium contains silver acetate.

4. The process of claim 3 wherein said aqueous medium contains acetic acid.

5. The process of claim 4 wherein said aqueous medium contains a complexing agent.

6. The process of claim 5 wherein said complexing agent is pyridene.

7. The process of claim 6 wherein the aqueous medium and propylene are mixed together in a reactor separate from the electrochemical cell.

8. The process of claim 2 wherein said aqueous medium contains a complexing agent.

9. The process of claim 8 wherein said complexing agent is 1,2,4-triazole, imidazole, pyrazole or a pyridene.

10. The process of claim 2 wherein said aqueous medium contains acetic acid.

11. The process of claim 2 wherein the said aqueous medium and propylene are mixed together in an electrochemical cell.

12. The process of claim 2 wherein the said aqueous medium and propylene are mixed together in a reactor separate from the electrochemical cell.

13. The process of claim 1 wherein said aqueous medium contains silver acetate.

14. The process of claim 13 wherein said aqueous medium contains acetic acid.

15. The process of claim 14 wherein said aqueous medium contains a complexing agent.

16. The process of claim 14 wherein the aqueous medium contains pyridene and the anolyte and olefin are mixed together in a reactor separate from the electrochemical cell.

17. The process of claim 1 wherein the olefin is ethylene and the olefin oxide is ethylene oxide.

18. The process of claim 1 wherein the olefin is butylene and the olefin oxide is butylene oxide.

19. The process of claim 1 wherein said aqueous medium contains cobalt acetate.

20. The process of claim 1 wherein the anode potential is below that at which gaseous oxygen is generated at the anode.

21. The process of claim 1 wherein said aqueous medium contains nickel acetate.

22. The process of claim 1 wherein said aqueous medium contains thallium acetate.

23. The process of claim 1 wherein said aqueous medium contains lithium acetate.

24. The process of claim 1 wherein said aqueous medium contains copper acetate.

25. The process of claim 1 wherein said effluent gas is substantially a mixture of olefin and olefin oxide and the olefin oxide is separated from the olefin by cooling the gas to a temperature where the olefin oxide condenses but the olefin does not.

26. The process of claim 1 wherein said aqueous medium contains a mixture of at least two of said acetates.

27. The process of claim 1 wherein said aqueous medium contains a complexing agent.

28. The process of claim 27 wherein said complexing agent is 1,2,4-triazole, imidazole, pyrazole or a pyridene.

29. The process of claim 1 wherein said aqueous medium contains acetic acid.

30. The process of claim 1 wherein the said aqueous medium and olefin are mixed together in a reactor separate from the electrochemical cell.

31. The process of claim 1 wherein the said aqueous medium and olefin are mixed together in an electrochemical cell.

32. The process of claim 1 wherein the anode is platinum, ruthenium, oxidized ruthenium, platinized titanium, ruthenium coated titanium, oxidized ruthenium coated titanium or lead oxide coated titanium.

* * * * *